United States Patent Office
3,038,901
Patented June 12, 1962

3,038,901
PHENYLPIPERAZINYLALKYL ESTERS
Shin Hayao, Elkhart, Ind., assignor to Miles Laboratories, Inc., Elkhart, Ind., a corporation of Indiana
No Drawing. Filed Mar. 17, 1960, Ser. No. 15,525
6 Claims. (Cl. 260—268)

This invention relates to new and useful compositions of matter and particularly to phenylpiperazinylalkyl esters which possess sedative activity and are useful in alleviations of nervous tension and anxiety.

More specifically, the new compounds may be designated as ω-(1-phenyl-4-piperazinyl)alkyl benzoates and represented by the following structural formula:

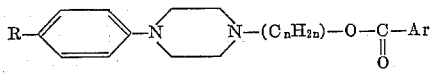

wherein R may be hydrogen, halogen, preferably chlorine, or a methoxy group; $C_nH_{2n}$ stands for a straight or branched alkylene chain with $n$ being at least 1 and at most 5; and Ar represents 4-methoxyphenyl, 3,4-dimethoxyphenyl, 3,4-methylenedioxyphenyl or 3,4,5-trimethoxyphenyl.

The novel compounds of this invention have utility as physiologically active agents; they possess sedative properties similar to, and improved over, those of reserpine, being constituted in part of the active portion of the reserpine molecule, namely, the 3,4,5-trimethoxybenzoyl moiety, or of other similar benzoyl moities, and a 1,4-disubstituted piperazinyl moiety, characterized by its central depressant activity and adrenergic blocking action.

Above defined compounds wherein R is hydrogen or halogen can be prepared by reacting 1-phenyl-piperazine or 1-p-halophenylpiperazine with an appropriate haloalkanol to produce a 1-phenyl-4-(ω-hydroxyalkyl)piperazine or 1-p-halophenyl-4-(ω-hydroxyalkyl)piperazine and reacting these intermediate piperazines with mono-, di- or tri-substituted benzoyl chlorides to obtain the desired phenylpiperazinylalkyl benzoates.

The mode of formation may be graphically presented by the following equation:

STEP 1

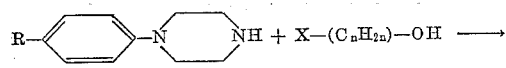

STEP 2

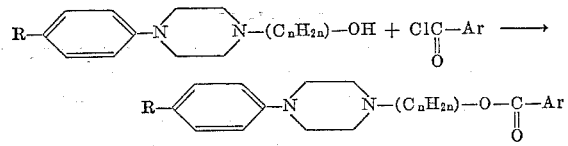

wherein $C_nH_{2n}$ and Ar have the meanings ascribed to them above, R is hydrogen or halogen and X is also halogen.

Moreover, it has been found that some compounds of this class can also be prepared by reacting the phenylpiperazine with a lower alkylene oxide, such as ethylene oxide or propylene oxide, as illustrated by Examples III and IV.

To obtain a compound wherein a methoxy radical is the R substituent in the para-position of the terminal phenyl portion of the defined alkyl ester, p-anisidine, ethylene oxide and thionyl chloride are employed as starting materials. The consequent reaction product, N,N-bis-(2-chloroethyl)-p-anisidine, is in turn reacted with an amino alkanol to produce the intermediate 1-p-methoxyphenyl-4-(ω-hydroxyalkyl)piperazine, which is then esterified as indicated above. These reactions are carried out according to the following diagrammatic presentation:

STEP 1

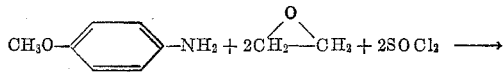

STEP 2

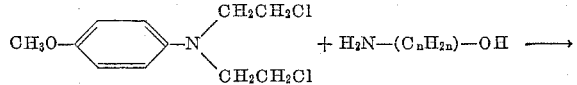

STEP 3

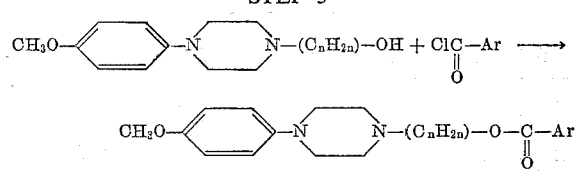

wherein $C_nH_{2n}$ and Ar have the meanings given to them above.

The present compounds may be obtained as free bases having the formula given above or preferably, for pharmacological use, as non-toxic, water-soluble addition salts of halogen acids, sulfuric acid, maleic acid, and the like.

These new compounds and the methods for their preparation may be exemplified more specifically by the following illustrative examples:

Example I 4-(1-phenyl-4-piperazinyl)butyl 3,4,5-trimethoxybenzoate dihydrochloride.—1-phenyl-4-(4-hydroxybutyl)piperazine was prepared in 23.7% yield from 0.2 mole each of 4-chlorobutanol and 1-phenylpiperazine in boiling ethanol in presence of anhydrous sodium carbonate. Unreacted amine was recovered in 33% yield. To a solution of 1-phenyl-4-(4-hydroxybutyl)piperazine (0.046 mole) in 150 ml. of benzene was added equimolar metallic sodium. To this milky solution was added dropwise a solution of 3,4,5-trimethoxybenzoyl chloride in 100 ml. of benzene. It was refluxed for an hour, washed with water and dried. The benzene solution was added to methanolic hydrogen chloride and boiled down with ethyl acetate until a crystalline solid separated. On cooling, the product was collected by suction, yield 18.3 g. (79.5%), M.P. 199–200° (d.). (Temperature degrees are given in centigrades.) A sample was recrystallized twice from methanol-ethyl acetate to give a colorless powder of M.P. 202° (d.).

Anal.—Calc'd for $C_{24}H_{32}N_2O_5 \cdot 2HCl$: N, 5.59; HCl, 14.57. Found: N, 5.68; HCl, 14.91.

PHARMACOLOGY

The acute median lethal dose (A-LD50) for oral administration to rats of this compound is 2,480 mg./kg. The acute median sedative dose (A-SD50) is 4.16% of the A-LD50 in the first hour and 4.24% of the A-LD50 in the third hour.

Up to 1,350 mg./kg., a "chick-like" posture, characteristic of reserpine, was seen in the first five hours after administration. No convulsions or hypnosis were observed before death dose.

A special sedation test demonstrated that at 9% of the A-LD50 four out of five rats, and at 20%, five out of five rats were sedated one hour after oral administration of the compound.

A "motor relaxation" screening showed that at 9% of the A-LD50 one out of five rats, and at 20%, five out of five rats were unable to walk on a rotor-rod one hour after its oral administration.

By a "convulsive facilitation" test the potential utility of this compound in the treatment of schizophrenia was demonstrated in that at 9% of the A-LD50 two out of five rats, at 13% and 20%, four out of five rats had convulsions at a minimum voltage one hour after its oral administration.

The above compound also possesses adrenergic blocking action shown in vivo in the following way: An intravenous dose of 8 mg./kg. in an anesthetized dog blocked and reversed the vasodepressor effect of injected epinephrine and partially blocked the effect of preganglionic cervical sympathetic stimulation on the pupil and nictitating membrane. The nictitating membrane response to injected epinephrine was also destroyed. A vasodepressor activity was observed at the same time with the compound producing a sustained fall in blood pressure.

Unlike reserpine the above compound had no cumulative effect.

*Example II*

3-(1-phenyl-4-piperazinyl)propyl 3,4,5-trimethoxybenzoate dihydrochloride.—1-phenylpiperazine (31.6 g., 0.2 mole) was alkylated with 3-bromopropanol (27.8 g., 0.2 mole) in 100 ml. of absolute ethanol in the presence of 15 g. of anhydrous sodium carbonate during 3 hours under reflux. The salt was removed, and the filtrate was freed from solvent leaving a syrup which was dissolved in dilute hydrochloric acid, heated with Norit, filtered and made alkaline with aqueous sodium hydroxide to give a sandy solid of M.P. 86–93°, yield 36.8 g. (83.5%). A sample was once recrystallized from aqueous methanol to give a colorless powder melting at 83–84°.

Anal.—Calc'd for $C_{13}H_{20}N_2O$: N, 12.7. Found: N, 12.9.

To a solution of 1-phenyl-4-(3-hydroxypropyl)piperazine (22.2 g., 0.1 mole) in 100 ml. of chloroform was added a solution, in 100 ml. of chloroform, of a crude 3,4,5-trimethoxybenzoyl chloride prepared from 3,4,5-trimethoxybenzoic acid (21.2 g., 0.1 mole) and 50 ml. of thionyl chloride. The reaction mixture was refluxed for 3 hours and the solvent was removed in vacuo to give a syrup, which was taken up in methanol, saturated with dry hydrogen chloride and boiled down with ethyl acetate to give a colorless solid of M.P. 182–184° (d.), yield 23.9 g. A sample was once recrystallized from methanol-ethyl acetate to give a pure product melting at 180–181° (d.).

Anal.—Calc'd for $C_{23}H_{30}N_2O_5 \cdot 2HCl$: N, 5.75. Found: N, 5.62 (Kjeldahl).

PHARMACOLOGY

The A-LD50 of this compound is 2480 mg./kg. No convulsions and hypnosis were observed at sublethal doses.

The sedation test demonstrated that at 20% of the A-LD50 five out of five rats were sedated, one as well as three hours after oral administration.

The "motor control" screening showed that at 20% of the A-LD50 five out of five rats were unable to walk on a rotor-rod one as well as three hours after administration.

By the "convulsive facilitation" test it was revealed that at 20% three out of five after one hour and none out of five after three hours had convulsions at minimum voltage.

*Example III*

2-(1-phenyl-4-piperazinyl)ethyl 3,4,5-trimethoxybenzoate dihydrochloride.—1-phenyl-4-(2-hydroxyethyl)-piperazine was prepared from 1-phenylpiperazine and ethylene oxide in hot methanol in 64.5% yield. One recrystallization from benzene-Skelly B gave a pure amino alcohol of M.P. 84–85°. One tenth molar solution of 1-phenyl-4-(2-hydroxyethyl)-piperazine and 3,4,5-trimethoxybenzoyl chloride in 100 ml. of chloroform was refluxed for three hours. The solvent was removed in vacuo, and the residue was taken up in methanol, saturated with dry hydrogen chloride and diluted with ethyl acetate while hot to separate 38.6 g. (88.5%) of the product melting at 185–189°. It was recrystallized twice from methanol-ethyl acetate to give a pure product of M.P. 188–190°.

Anal.—Calc'd for $C_{22}H_{28}N_2O_5 \cdot 2HCl$: N, 5.92; HCl, 15.43. Found: N, 5.93; HCl, 15.31.

PHARMACOLOGY

The A-LD50 of this compound is 2480 mg./kg. No convulsions were noted for doses up to 122% of the A-LD50. The hypnotic dose 50 (HD50) is 66% of the A-LD50.

A special sedation test showed that at 20% of the A-LD50 five out of five animals were sedated one and three hours after oral administration.

A "motor relaxation" test demonstrated that at 20% of the A-LD50 five out of five rats were unable to walk on a rotor-rod one as well as three hours after administration.

The "convulsive facilitation" test revealed that at 20% of the A-LD50 one hour after administration four out of five rats, and three hours after administration none out of five rats had convulsions at a minimum voltage.

*Example IV*

1-methyl-2-(1-phenyl-4-piperazinyl)ethyl 3,4,5-trimethoxybenzoate dihydrochloride.—1-phenyl-4-(2-hydroxypropyl)piperazine was prepared in 83% yield from 1-phenylpiperazine and propylene oxide in hot methanol, M.P. 76–78°. One tenth molar mixture of 1-phenyl-4-(2-hydroxypropyl)piperazine and 3,4,5-trimethoxybenzoyl chloride in 100 ml. of chloroform was refluxed for 5 hours. The solvent was removed in vacuo and the remaining semi-solid was taken up in methanol, treated with dry hydrogen chloride and boiled down with ethyl acetate until a crystalline solid separated, yield 38.5 g. (85.5%), M.P. 197–199°. Two recrystallizations from methanol-ethyl acetate gave 32.6 g. of pure product melting at 202–204° (d.).

Anal.—Calc'd for $C_{23}H_{30}N_2O_5 \cdot 2HCl$: N, 5.75; HCl, 14.99. Found: N, 5.85; HCl, 15.13.

PHARMACOLOGY

The A-LD50 of this compound is 1655 mg./kg. The convulsive dose (CD50) is 72% of the A-LD50.

The sedation test showed that at 20% of the A-LD50 one hour after administration three out of five and after three hours four out of five rats were unable to walk on a rotor-rod.

The "convulsive facilitation" test demonstrated that at 20% of the A-LD50 none of five animals had convulsions at a minimum voltage one hour as well as three hours after oral administration.

*Example V*

2-(1-p-methoxyphenyl-4-piperazinyl)ethyl 3,4,5-trimethoxybenzoate dihydrochloride.—p-Anisidine (425 g., 3.45 mole) in 450 ml. of methanol was treated with ethylene oxide for 8 hours at its boiling point. The solvent was removed in vacuo to leave a solid mass of M.P. 68–72°. It was dissolved in 750 ml. of chloroform, cooled in an ice-water bath and saturated with dry hydrogen chloride. Then 900 g. (7.55 mole) of thionyl chloride was added dropwise during 4 hours to maintain gentle reflux and stirred at room temperature for 20 hours. The solvent and excess thionyl chloride was removed in vacuo to give a dark solid mass which was dissolved in 1500 ml. of methanol, treated with Norit, filtered and diluted with ethyl acetate to give 739.5 g. (75.5%) of a crude bis-(2-chloroethyl)-p-anisidine hydrochloride, M.P. 160–163°. One recrystallization from methanol-ethyl acetate gave a snow white solid of M.P. 164–168°, yield 596 g.

A solution of the bis-chloro compound (68.8 g., 0.232 mole) and ethanolamine (73 g., 1.2 mole) in 150 ml. of isopropyl alcohol was refluxed for 5 hours. After removing the solvent, the remaining solid mass was triturated with water to give 41.2 g. (75.5%) of 1-p- methoxyphenyl-4-(2-hydroxyethyl)piperazine, M.P. 88–89°. One recrystallization from benzene-Skelly B gave 38.5 g. of the pure product melting at 92–93°.

*Anal.*—Calc'd for $C_{13}H_{20}N_2O_2$: N, 5.93 (basic N). Found: N, 5.86.

A solution of the amino alcohol (23.6 g., 0.1 mole) and 3,4,5-trimethoxybenzoyl chloride (23.1 g., 0.1 mole) in 150 ml. of chloroform was refluxed for an hour, the solvent was removed in vacuo and the residue was dissolved in methanol. It was treated with dry hydrogen chloride and diluted with ethyl acetate while hot to give 42.2 g. (84%) of the product, M.P. 199–201° (softening at 190°). It was once recrystallized from aqueous methanol-ethyl acetate to give colorless crystals of M.P. 205–206° (d.), yield 30.0 g.

*Anal.*—Calc'd for $C_{23}H_{30}N_2O_6 \cdot 2HCl$: HCl, 14.5. Found: HCl, 14.5.

Example VI

*3-(1-p-chlorophenyl - 4 - piperazinyl)propyl 3,4,5 - trimethoxybenzoate dihydrochloride.*—1-p-chlorophenyl - 4-(3-hydroxypropyl)piperazine was prepared in 89% yield from 0.1 mole of each of 3-bromo-1-propanol and 1-p-chlorophenylpiperazine in boiling ethanol in the presence of anhydrous sodium carbonate. A solution of the thus-obtained piperazine (11.1 g., 0.044 mole) and 3,4,5-trimethoxybenzoyl chloride (10.4 g., 0.044 mole) in 100 ml. of chloroform was refluxed for an hour to give a gelatinous mixture. The solvent was removed in vacuo and the residue was dissolved in 100 ml. of hot methanol, saturated with dry hydrogen chloride and ethyl acetate was added to separate a colorless solid. It was collected by suction and dried in a vacuum desiccator. It was recrystallized once from hot methanol to give colorless sandy crystals of M.P. 187–188° (d.), yield 11.4 g. (50.3%).

*Anal.*—Calc'd for $C_{23}H_{31}Cl_3N_2O_5$: HCl, 14.0. Found: HCl, 13.8.

In accordance with the methods described in greater detail in the above examples, the following compounds within the general formula were also manufactured:

Example VII

*3-(1-p-methoxyphenyl-4 - piperazinyl)propyl 3,4,5-trimethoxybenzoate dihydrochloride.*—M.P. 203–204°.

*Anal.*—Calc'd for $C_{24}H_{34}Cl_2N_2O_6$: HCl, 14.6. Found: HCl, 14.8.

Example VIII

*2-(1-p-chlorophenyl-4-piperazinyl)ethyl 3,4,5-trimethoxybenzoate dihydrochloride.*—M.P. 194–194.5°.

*Anal.*—Calc'd for $C_{22}H_{29}Cl_3N_2O_5$: HCl, 14.4. Found: HCl, 14.4.

Example IX

*4-(1-phenyl - 4-piperazinyl)butyl 3,4 - dimethoxy - benzoate dihydrochloride.*—M.P. 184–185°.

*Anal.*—Calc'd for $C_{23}H_{32}Cl_2N_2O_4$: HCl, 15.5. Found: HCl, 15.8.

Example X

*4-(1-phenyl-4-piperazinyl)butyl 3-methoxybenzoate dihydrochloride.*—M.P. 210–211°.

*Anal.*—Calc'd for $C_{22}H_{30}Cl_2N_2O_3$: HCl, 16.6. Found: HCl, 16.9.

Example XI

*4-(1-phenyl-4 - piperazinyl)butyl 3,4 - methylenedioxybenzoate dihydrochloride.*—M.P. 215–218°.

*Anal.*—Calc'd for $C_{22}H_{28}Cl_2N_2O_4$: HCl, 16.0. Found: HCl, 16.3.

Pharmaceutical compositions which are useful to induce sedation are conveniently and easily produced by combining a compound of the class hereinbefore described with fillers, carriers, extenders and/or excipients, such as are generally used in the preparation of pharmaceutical products which are to be taken orally or given parenterally. The compounds may be used in the form of the free base or of the salts of acids which are water-soluble and non-toxic, such as the hydrochloride, hydrobromide, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salts, with such common diluents or tabletting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic water-soluble salts, may be associated with such carriers as water, saline solution, glucose solution and the like.

This application is a continuation-in-part of my application, Serial Number 752,425, filed August 1, 1958, now abandoned.

What is claimed is:

1. A composition of matter selected from the group consisting of phenylpiperazinylalkyl esters represented by the formula

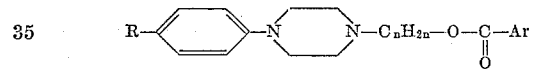

wherein R is a member of the group consisting of hydrogen, chlorine and methoxy, $C_nH_{2n}$ is selected from the group consisting of members of straight and branched alkylene chains in which n is a member taken from the group consisting of 1, 2, 3, 4 and 5, and Ar is a member of the group consisting of 4-methoxyphenyl, 3,4-dimethoxyphenyl, 3,4-methylenedioxyphenyl and 3,4,5-trimethoxyphenyl; and non-toxic water-soluble acid addition salts thereof having therapeutically acceptable anions.

2. 4-(1-phenyl-4-piperazinyl)butyl 3,4,5 - trimethoxybenzoate.

3. 3-(1-phenyl - 4-piperazinyl)propyl 3,4,5-trimethoxybenzoate.

4. 2-(1-phenyl - 4-piperazinyl)ethyl 3,4,5-trimethoxybenzoate.

5. 1-methyl-2-(1-phenyl-4 - piperazinyl)ethyl 3,4,5-trimethoxybenzoate.

6. 2-(1-p-methoxyphenyl-4-piperazinyl)ethyl 3,4,5-trimethoxybenzoate.

References Cited in the file of this patent

UNITED STATES PATENTS 2,824,874  Schlitter _____ Feb. 25, 1958

OTHER REFERENCES

Chemical Abstracts, vol. 29, page 2959 (1935).